United States Patent
Lim et al.

(10) Patent No.: US 10,467,496 B2
(45) Date of Patent: Nov. 5, 2019

(54) TEMPORAL FILTERING OF INDEPENDENT COLOR CHANNELS IN IMAGE DATA

(71) Applicant: Apple Inc., Cupertino, CA (US)

(72) Inventors: Suk Hwan Lim, Mountain View, CA (US); D. Amnon Silverstein, Palo Alto, CA (US); Sheng Lin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 419 days.

(21) Appl. No.: 14/841,412

(22) Filed: Aug. 31, 2015

(65) Prior Publication Data

US 2017/0061582 A1   Mar. 2, 2017

(51) Int. Cl.
*G06K 9/40* (2006.01)
*G06K 9/62* (2006.01)
*G06T 5/00* (2006.01)

(52) U.S. Cl.
CPC ............ *G06K 9/6201* (2013.01); *G06T 5/002* (2013.01); *G06T 2207/20182* (2013.01)

(58) Field of Classification Search
None
See application file for complete search history.

(56) References Cited

U.S. PATENT DOCUMENTS

| | | | |
|---|---|---|---|
| 7,970,229 B2 | 6/2011 | Connell | |
| 8,149,336 B2 | 4/2012 | Mohanty et al. | |
| 8,184,721 B2 | 5/2012 | Mitchell | |
| 8,467,626 B2 | 6/2013 | Bhagavathy et al. | |
| 8,503,812 B2 | 8/2013 | MacInnis et al. | |
| 2009/0324121 A1* | 12/2009 | Bhagavathy | G06T 5/50 382/260 |
| 2010/0045870 A1* | 2/2010 | Chao | H04N 5/21 348/607 |
| 2010/0309377 A1* | 12/2010 | Schoenblum | G06T 5/002 348/607 |
| 2011/0090351 A1* | 4/2011 | Cote | G06T 5/002 348/208.1 |
| 2013/0083246 A1* | 4/2013 | Chen | G06T 5/002 348/620 |
| 2013/0322753 A1* | 12/2013 | Lim | G06T 5/001 382/167 |
| 2014/0247365 A1* | 9/2014 | Gardner | H04N 5/21 348/165 |
| 2014/0286408 A1* | 9/2014 | Zhang | H04N 19/159 375/240.12 |

(Continued)

*Primary Examiner* — Sean M Conner
(74) *Attorney, Agent, or Firm* — Robert C. Kowert; Meyertons, Hood, Kivlin, Kowert & Goetzel, P.C.

(57) ABSTRACT

An image processing pipeline may perform temporal filtering on independent color channels in image data. A filter weight may be determined for a given pixel received at a temporal filter. The filter weight may be determined for blending a value of a channel in a full color encoding of the given pixel with a value of the same channel for a corresponding pixel in a previously filtered reference image frame. In some embodiments, the filtering strength for the channel may be determined independent from the filtering strength of another channel in the full color encoding of the given pixel. Spatial filtering may be applied to a filtered version of the given pixel prior to storing the given pixel as part of a new reference image frame.

17 Claims, 5 Drawing Sheets

(56) References Cited

U.S. PATENT DOCUMENTS

2015/0117793 A1* 4/2015 Deng .................... G06T 5/20
                                                    382/261
2016/0127728 A1* 5/2016 Tanizawa ............... H04N 19/30
                                                    375/240.02
2016/0322063 A1* 11/2016 Lu .......................... H04R 3/04

* cited by examiner

TEMPORAL FILTERING OF INDEPENDENT COLOR CHANNELS IN IMAGE DATA

BACKGROUND

Image data captured by an image sensor is often initially processed as part of an image processing pipeline in order to prepare the captured image data for further processing or consumption. In this way, real-time corrections or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor of a device, apparatus, or computing system that includes a camera or other image sensor capable of capturing image data may, in some embodiments, be configured to perform temporal filtering on independent channels in the full color encoding of a given pixel. A filter weight for blending a pixel of a current image frame with a pixel of a previously filtered reference image frame may be determined that is specific to blending a channel value for the two pixels of the full color encoding. The filtered version of the given pixel may then be generated according to the filter weight. For some image frames, not all channels of the full color encoding may be temporally filtered. A spatial filter may also be applied to the temporally filtered version of the pixel, in some embodiments, prior to storing the filtered version of the pixel as part of the next reference image frame.

Figure 1:
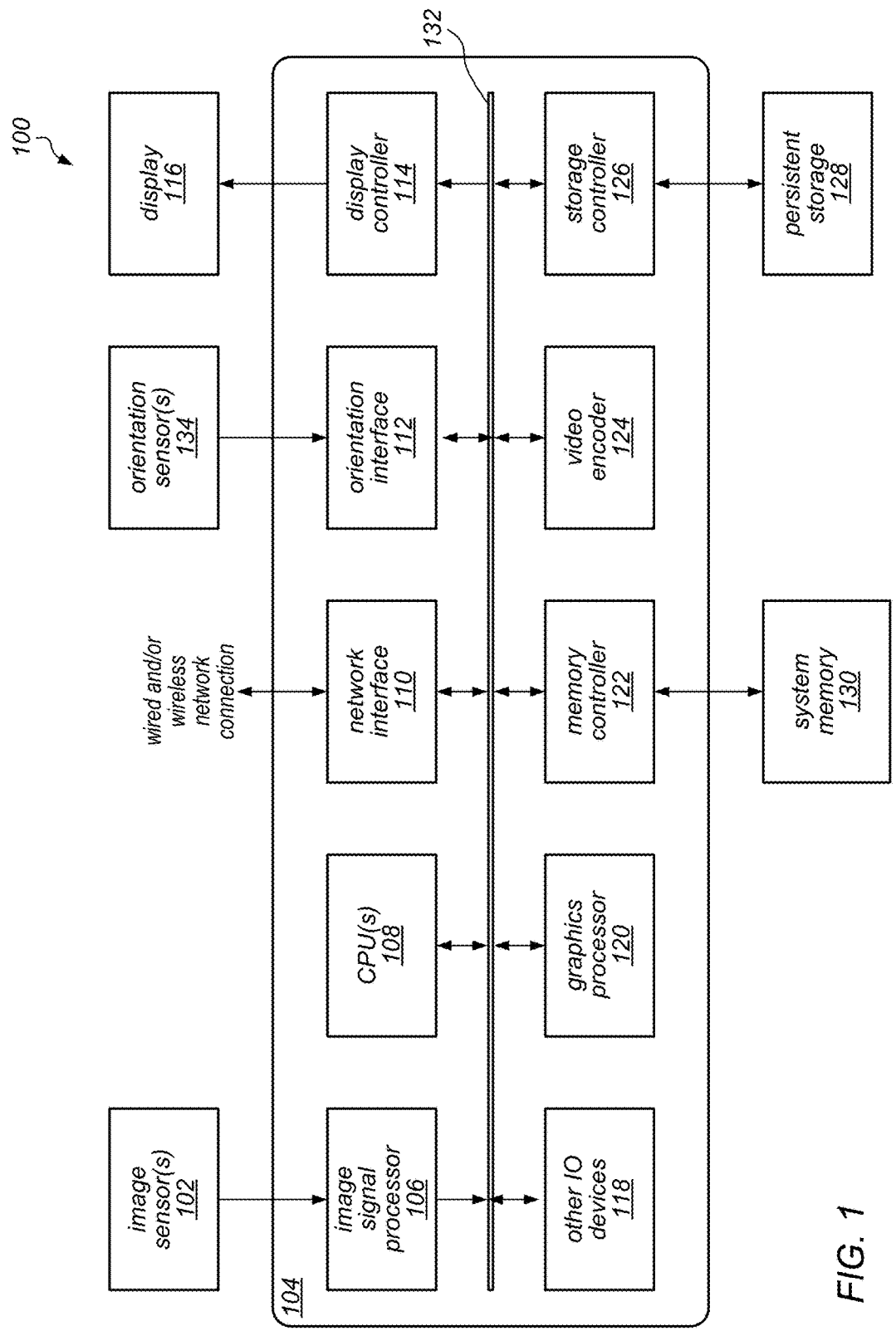
FIG. 1 is a logical block diagram illustrating an example system that may implement an image processing pipeline that performs temporal filtering on independent color channels in image data, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques or components to correct or enhance image data captured by an image sensor. For example, an image sensor may provide a stream of image data in order to capture a high resolution still image or an image frame as part of a video recording. An image signal processor may process image data in an image processing pipeline through various processing stages to apply image effects, remove defects or errors captured or created in image data, or remove signal noise from the image data which distorts the quality of the image data. For instance, a temporal filter may be implemented to perform noise filtering on image data, in various embodiments. Temporal filtering is based on filtering the pixel values of a current image frame captured at an image sensor using pixel values of a previously filtered image frame. Pixel values from the previously filtered image frame, referred to herein as the reference image frame, may be combined with the pixel values of the current image frame to get a best estimate of the pixel values with reduced noise. Over time, as more image frames are filtered at the temporal filter, the reference image frame may provide a higher quality image with less noise.

Performing temporal filtering on independent color channels in image data may provide better temporal filtering performance, whether by performing temporal filtering on those color channels which are noisier or by providing greater control over the filtering of particular portions of the image data in different image capture scenarios. For a given pixel received at a temporal filter, a filter weight may be determined for blending a value of a channel in a full color encoding of the given pixel with a value of the same channel for a corresponding pixel in a previously filtered reference image frame. In some embodiments, the filtering strength for the channel may be determined independent from the filtering strength of another channel in the full color encoding of the given pixel. Motion estimation and compensation may also be performed based on a particular channel of the full color encoding. Additionally, spatial filtering may be applied to a filtered version of the given pixel generated at the temporal filter prior to storing the given pixel as part of a new reference image frame.

The techniques described herein for performing temporal filtering of independent color channels in image data may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes image sensor(s) 102, a system-on-a chip (SOC) component 104, system memory (e.g., DRAM) 130, persistent storage (e.g., flash memory) 128, and a display 116 (e.g., LCD or OLED). In this example, image sensor(s) 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images or video clips (which may be provided as output from image signal processor 106). Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 or SOC component 104 may include more or fewer elements than those shown in FIG. 1.

In various embodiments, SOC component 104 may be a uniprocessor system including one processor, or a multiprocessor system including several processors or several processing cores (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, ARM™, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. For example, video or other image data may be received from other devices (e.g., a content provider network or another mobile computing device) via network interface 110 and be stored in system memory 130 for subsequent processing (e.g., via a back-end interface to image signal processor 106, such as discussed below in FIG. 3) and display. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 130 may be executed by CPU 108 or GPU 120 to provide various functions of system 100.

In other embodiments, various functions may be performed by software components executing in memory on another device and communicating with the illustrated system via inter-computer communication. Some or all of these software components or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
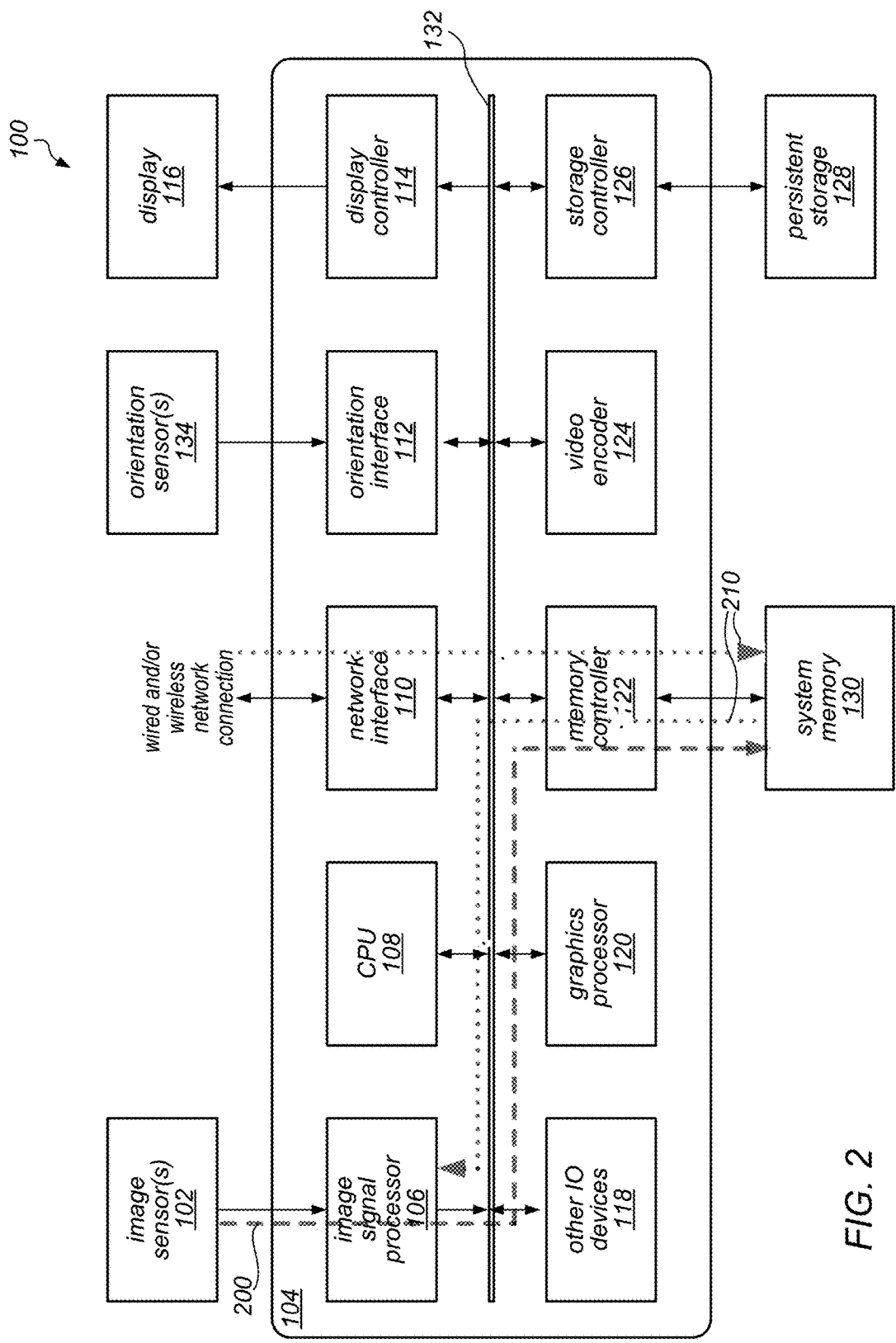
FIG. 2 is a logical block diagram illustrating example data paths in a system that may implement an image processing pipeline that performs temporal filtering on independent color channels in image data, according to some embodiments.

FIG. 2 is a block diagram illustrating data paths in a system that implements an image signal processor (specifically, in system 100 illustrated in FIG. 1), according to some embodiments. As illustrated by the dashed lines in one example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

Another example data path is illustrated by the dotted lines 210. Image data, such as video image or data or image stills or frames, may be received by system 100 from sources other than the image sensor(s) 102. For example, video data may be streamed, downloaded, or otherwise communicated to the system 100 via wired or wireless network connections from other sources remote to system 100 (e.g., a content provider network or other mobile computing device). The image data may be received via network interface 110 and written to memory 130 via memory controller 122. The image data may then be obtained by image signal processor 106 from memory 130 and processed through one or more image processing pipeline stages, in some embodiments, to perform various image correction, translation, conversion, or other image processing techniques. The image data may then be returned to memory 130, video encoder 124, or other component such as display controller 113 for display at display 116 or to storage controller 126 for storage at persistent storage 128 (not illustrated).

In some embodiments graphics processor 120 may access, manipulate, transform or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, or display controller 114) without storing the image data to system memory 130.

Figure 3:
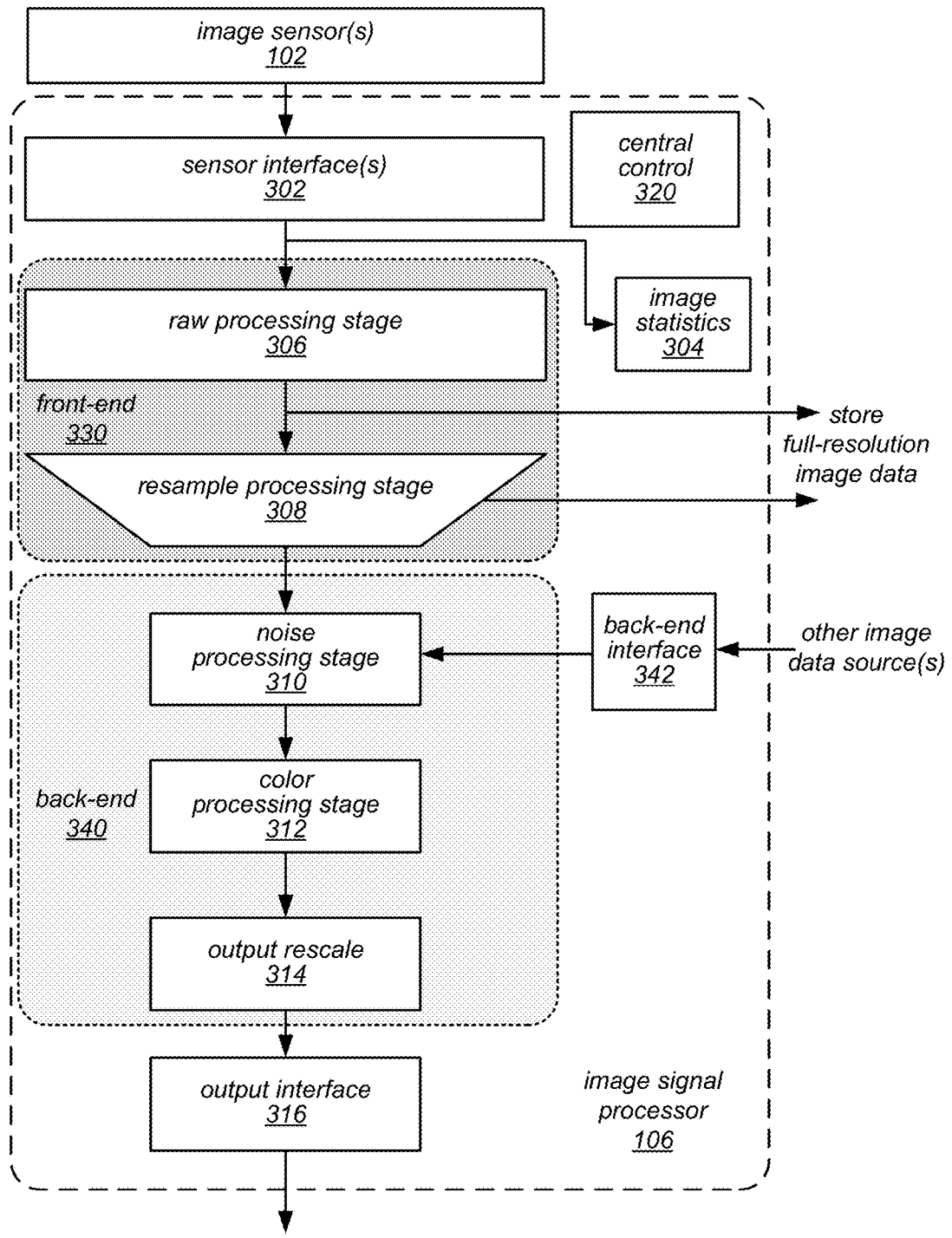
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to image sensor(s) 102 (from which it receives image data). In this example, ISP 106 implements an image processing pipeline which may include a set of stages that process image information from creation, capture, or receipt to output. For example, the various elements illustrated as components of ISP 106 process source data received from image sensor 102 through sensor interface(s) 302 into image data processable by other stages in the pipeline (e.g., image statistics 304, raw image processing 306, resample processing stage 308, noise processing stage 310, color processing stage 312, or output rescale 314), by other components of a system that includes ISP 106 via output interface 316 (including those that access the transformed data from the system memory after it is written to the system memory via memory controller interface 122 or are provided the image data via interconnect 132 directly) or back-end interface 342, or by other devices coupled to the system that includes ISP 106. In at least some embodiments, sensor interface(s) 302 may perform various preprocessing operations, such as pixel defect correction to detect and correct defects and created by special pixels, and image cropping or binning to reduce image data size. Note that in some embodiments, the image signal processor 106 is a streaming device. In other words, pixels may be received by the image signal processor 106 from the image sensor 102 via sensor interface(s) 302 in raster order (i.e., horizontally, line by line) and may in general be processed through its various pipeline stages in raster order, until finally being output in raster order.

Image signal processor 106 may process image data received at image signal processor (sometimes referred to as an ISP) at different rates. For example, in the example embodiment illustrated in FIG. 3, image signal processor may implement one or more front-end pipeline stages 330, such as raw processing stage 306 and resample processing stage 308, which process image data at an initial rate. Thus, the various different techniques, adjustments, modifications, or other processing operations performed at these front-end pipeline stages (such as those described below with respect to raw processing stage 306 and resample processing stage 308) may be implemented so that the image data may be continuously processed through these stages at the initial rate. For example, if the front-end pipeline stages 330 process 2 pixels per clock cycle (ppc), then raw processing stage 306 operations like black level compensation, highlight recovery, defective pixel correction, and others, may process 2 pixels of image data at a time.

In addition to processing the image data at front-end pipeline stages at an initial rate, image signal processor 106 may implement one or more back-end pipeline stages that process image data a different rate. The back-end pipeline stages 340 may, in various embodiments, process image data at a reduced rate that is less than the initial data rate. For example, as illustrated in FIG. 3, back-end pipeline stages 340, such as noise processing stage 310, color processing stage 312, and output rescale 314, may be implemented so that the image data is processed according to the reduced rate. Given the above example of front-end stages 330 processing image data at 2 ppc, then noise processing stage 310 may implement operations such as temporal filtering and luma sharpening to process image data at a rate less than 2 ppc, such as 1 ppc.

In at least some embodiments, image signal processor 106 may implement back-end interface 342. Back-end interface 342 may receive image data from other image sources than image sensor(s) 102. For instance, as illustrated in FIG. 2, image data received over a wireless connection may be received and stored in memory 130. The image data may be received through back-end interface 342 for processing at back-end stages 340 of image signal processor 106. In this way, image signal processor 106 can be configured to provide resource efficient image processing capacity to data received from other image data source(s) instead of (or in addition to) CPU or GPU processing performed on the image data. In various embodiments, back-end interface 342 may convert image data to a format that is utilized by back-end processing stages. For instance, back-end interface 342 may convert RGB, YCbCr 4:2:0, or YCbCr 4:2:2 formatted image data into YCbCr 4:4:4 color format. Please note that back-end interface 342 may convert from various color formats, and thus the previous examples are not intended to be limiting.

In various embodiments, image signal processor 106 may implement central control module 320. Central control module 320 may configure and start the processing of image data, in some embodiments. For example, central control module 320 may implement performance monitors for logging clock cycles, memory latency, quality of service, and state information. Central control module 320 may update or manage control parameters for units, modules, stages, or other components of ISP 106, and may interface with sensor interface 302 to control the starting and stopping of the of the units, modules, stages, or other components. For example, in some embodiments, a unit, module, stage, or other component may go into an idle state during which programmable parameters may be updated by central control module 320. The unit, module, stage, or other component may then be placed into a run state, to perform one or more operations or tasks. In other examples, central control module 320 may configure image signal processor 106 to store image data (e.g., to be written to a memory, such as memory 130 in FIG. 2) before, during, or after resample processing stage 308. In this way full-resolution image data whether in raw or full color encoding format may be stored in addition to or instead of processing the image data output from resample processing stage 308 through backend pipeline stages.

In various embodiments, image signal processor 106 may implement image statistics module(s) 304. Image statistics module(s) 304 may perform various functions and collect information. For example image statistics module may, in some embodiments perform sensor linearization, defective pixel replacement, black level compensation, lens shading correction, and inverse black level compensation in order to collect image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting. In some embodiments, certain pixels' values, or areas of pixel values may be excluded from statistics collections, such as from AF statistics, when the statistics operations like sensor linearization, defective pixel replacement, black level compensation, lens shading correction, and inverse black level compensation identify clipped pixels. In scenarios where multiple image statistics modules 304 are implemented, each statistic module may be programmed by central control module 320 to collect different information for the same image data, or different image data collected for different images (e.g., collected from different ones of image sensor(s) 102).

As noted above, image signal processor 106 may implement one or multiple front-end pipeline stages, such as raw processing stage 306 and resample processing stage 308, which may process image data in raw or full color encodings. Raw processing stage 306 may, in various embodiments implement a variety of modules, units, or components to perform various operations, functions, or tasks on raw image data. Bayer raw format, for example, may be image data collected from image sensor(s) 102 that implement a Bayer pattern of pixel sensors. For instance, some pixel sensors only capture green light, while other pixel sensors capture red or blue light in a Bayer pattern of pixels. In this way, image data in Bayer raw image format (or other raw image format captured by a color filter array in an image sensor) provides pixel data with values specific to a particular color (instead of all colors).

Raw processing stage 306 may thus process image data in a raw format (such as Bayer raw format) applying various operations including, but not limited to, sensor linearization, black level compensation, fixed pattern noise reduction, defective pixel correction, raw noise filtering, lens shading correction, white balance gain, and highlight recovery. A sensor linearization unit may, in some embodiments, map non-linear image data to linear space for other processing (e.g., to convert image data from a companding format collected from a High Dynamic Range (HDR) image sensor which may be one of image sensor(s) 102). Black level compensation may, in some embodiments, be performed to provide digital gain, offset and clip independently for each color component (e.g., Gr,R,B,Gb) on the pixels' image data (which may occur after sensor linearization). In some embodiments, fixed pattern noise reduction may be performed to remove offset fixed pattern noise and gain fixed pattern noise by subtracting a dark frame from an input image and multiplying different gains to pixels, in some embodiments. Defective pixel correction may determine or identify defective pixels, and may replace defective pixel values, in various embodiments. Raw noise filtering may reduce noise of image data, in various embodiments, by averaging neighbor pixels that are similar in brightness. Highlight recovery may, in various embodiments, estimate pixel values for those pixels that are clipped (or nearly clipped) from other channels. Lens shading correction may apply a gain per pixel to compensate for a dropoff in intensity roughly proportional to a distance from a lens optical center. White balance gains may provide digital gains for white balance, offset and clip independently for all color components (e.g., Gr,R,B,Gb in Bayer format). Please note that various examples and descriptions provided above are not intended to be limiting as to the various techniques, components, or formats of raw processing stage 306 but are instead merely provided as examples. Various components, units, or modules may be broken apart into multiple different pipeline processing stages. Also note that in some embodiments, various ones of the components, units, or modules may convert raw image data into full color encoding, and thus raw processing stage 306 may, at various portions, process image data in the full color encoding in addition to or instead of raw image data. For instance, a simple demosaic unit may receive data from raw noise filtering and interpolate a full color encoding for raw image data to perform lens shading correction, white balance gain, or highlight recovery before converting the image data back to a raw image format.

In various embodiments, image signal processor 106 may implement resample processing stage 308. Resample processing stage 308 may perform various operations to convert, resample, or scale image data received from raw processing stage 306 and may provide as output image data accordingly at a reduced rate such as may be processed by a back-end pipeline stages 340. Please note, that in some embodiments, some or all of the portions of resample processing stage may be implemented as part of raw processing stage and thus the previous description is provided as an example pipeline stages in an image processing pipeline which may implement multi-rate processing for image data.

In various embodiments, image signal processor 106 may implement one or more back-end pipeline stages 340 to process image data at rate that is less than the initial rate for processing image data in front-end stages 330 (e.g., 4 ppc initial rate>3, 2, or 1 ppc reduced rate). In at least some embodiments, back-end pipeline stages 340 may process image data according to a particular full color format (e.g., YCbCr 4:4:4 or RGB) in which resample processing stage 308 or back-end interface 342 may provide to back-end stages 340. Please note, that in some embodiments, various ones of the back-end stages 340 may be configured to convert image data to the particular full color format (or may utilize different full color formats for processing), and thus the previous example is not intended to be limiting.

Image signal processor 106 may implement noise processing stage 310, in some embodiments. Noise processing stage 310 may, in various embodiments implement a variety of modules, units, or components to perform various operations, functions, or tasks, in different orders, such as gamma/de-gamma mapping, color space conversion, temporal filtering, noise filtering, luma sharpening, and chroma noise reduction. Color space conversion may convert image data to another color format or space (e.g., RBG to YCbCr). Gamma mapping may provide non-linear mapping functions for particular color channels of pixel data (e.g., Y, Cb, and Cr channels) in order to apply different image effects, including, but not limited to, black and white conversion, sepia tone conversion, negative conversion, or solarize conversion). Temporal filtering may be performed, in various embodiments, to filter image signal noise based on pixel values from a previously filtered image frame. Pixel values from the previously filtered image frame (which may be referred to herein as the reference image frame), may be combined with pixel values of a current image frame to get a best estimate of the pixel values. For example, a temporal filter may average the pixel values in the current image frame and the corresponding pixels in the reference image frame when the current image frame and the reference image frame are similar. In at least some embodiments, temporal filtering may be performed upon individual color channel values of a full color encoding of pixel data. For instance, a temporal filter may filter luminance (Y) channel values (from image data in YCbCr format) with Y channel values in the reference frame (without filtering on other channels like Cb or Cr).

Other noise filtering, such as spatial noise filtering may be performed. In at least some embodiments, luma sharpening and chroma suppression may be performed to as part of spatial noise filtering in simultaneous or near simultaneous fashion. Luma sharpening may sharpen luma values of pixel data, in some embodiments. Chroma suppression may attenuate chroma to gray (i.e. no color), in some embodiments. The aggressiveness of noise filtering may be determined differently for different regions of an image, in some embodiments. Spatial noise filtering may be included as part of a temporal loop implementing temporal filtering as discussed above. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame). Please note that various examples and descriptions provided above are not intended to be limiting as to the various techniques or components implemented as part of noise processing stage 310, but are instead merely provided as examples.

Image signal processor 106 may implement color processing stage 312, in some embodiments. Color processing stage 312 may, in various embodiments implement a variety of modules, units, or components to perform various operations, functions, or tasks, in different orders, such as local tone mapping, gain/offset/clip, color correction, three-dimensional color lookup, gamma conversion, and color space conversion. Local tone mapping may, in some embodiments, apply spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain, offset and clip may be provided for each color channel or component of image data, in some embodiments. Color correction may be implemented, in some embodiments, applying a color correction transform matrix to image data. 3D color lookup may utilize a three dimensional array of color component output values (e.g., R, G, B) to perform advanced tone mapping, color space conversions, and other color transforms, in some embodiments. Gamma conversion may be performed, mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

In various embodiments, image signal processor 106 may implement output rescale module 314. Output rescale module 314 may resample, transform and correct distortion on the fly as the ISP 160 processes image data. Output rescale module 314 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may, in various embodiments, apply transforms to image data as it is processed at output rescale module 314. Output rescale module 314 may include horizontal and vertical scaling components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may generate a best guess of where to center the vertical support window automatically.

In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

Note also that, in various embodiments, the functionally of units 302-342 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4 and 5) may be implemented in various combinations of hardware.

Figure 4:
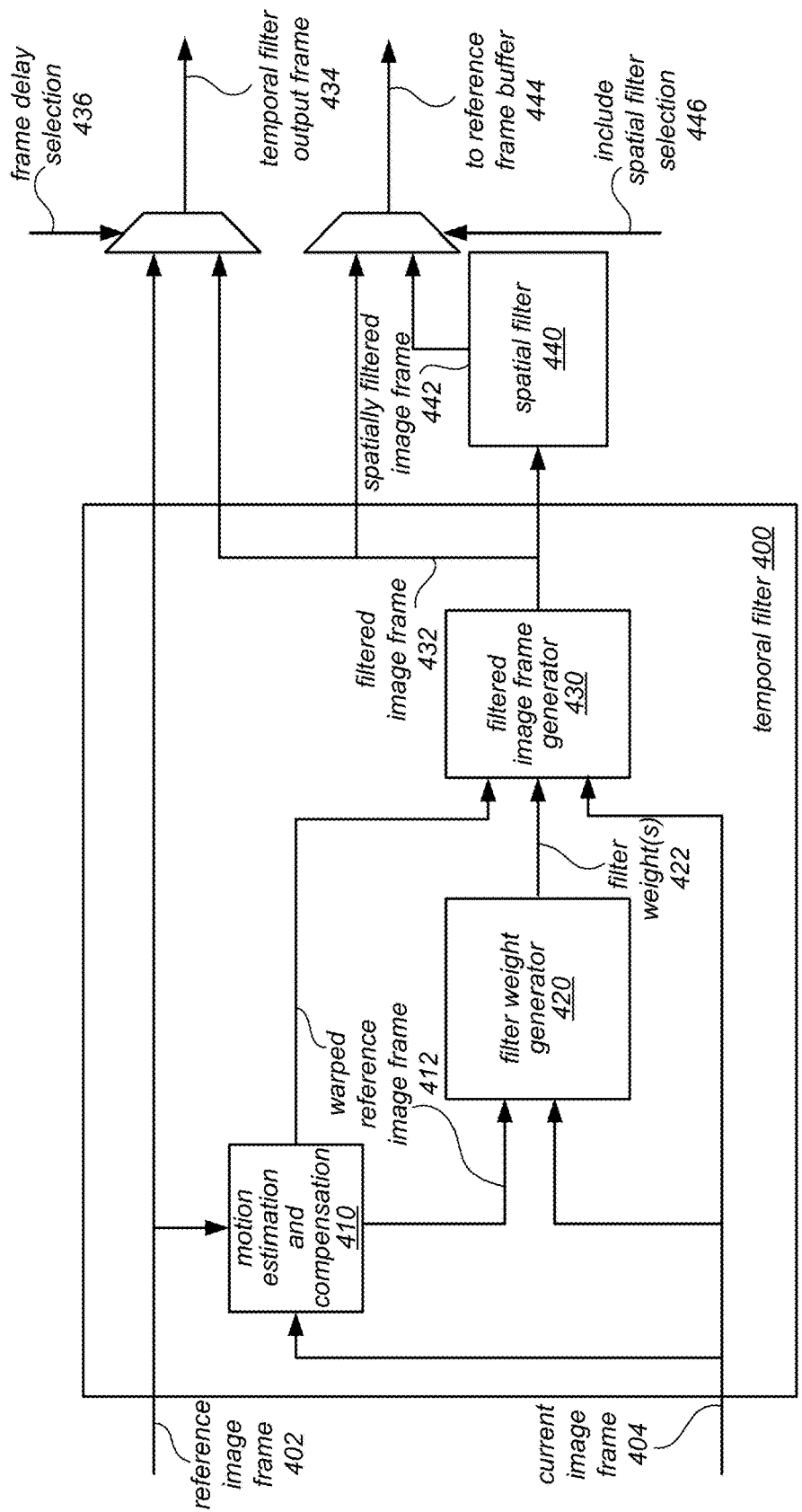
FIG. 4 is a logical block diagram illustrating a temporal filter in an image signal processor, according to some embodiments.

As noted above, in various embodiments, image signal processor 106 may perform temporal filtering on independent color channels of image data. FIG. 4 is a logical block diagram illustrating a temporal filter in an image signal processor, according to some embodiments, that may perform temporal filtering on independent color channels of image data. Temporal filter 400 may be a module or component implemented as part of an image processing pipeline, such as image signal processor 106 illustrated above in FIG. 3. In at least some embodiments, temporal filter 400 may be implemented as part of noise processing stage 310. The image data provided to temporal filter 400 may, in some embodiments, be represented in a full color encoding. For example, a full color encoding may be in RGB or luminance-chrominance (e.g., YCbCr 4:2:0, YCbCr 4:2:2, or YCbCr 4:4:4 color formats) or any other format of a full color encoding (e.g., those full color formats which resample processing stage 308 may convert raw image data received from raw processing stage 306 into). In some embodiments, temporal filter module 400 may receive image data (e.g., pixels) that has been processed at one or more proceeding components implemented within noise processing stage 310 (or a prior image processing stage, such as raw processing stage 306). For example, in some embodiments, other filters or correction components, such as gamma mapping, de-gamma mapping, or color correction components, may process image data and provide that image data to temporal filter module 400.

Current image frame 404 may be image data (e.g., pixels) of a current image that are received at temporal filter 400 in order to generate a filtered version of the pixels as part of generating a filtered version of the current image frame being processed (e.g., live image data from the image sensor or stored image data in a memory/buffer received via back-end interface 342). For instance, current image frame 404 may be image data received in a luminance-chrominance full color encoding (e.g., YCbCr 4:4:4) for noise filtering at temporal filter 400. Similarly, reference image frame 402 may be image data (e.g., pixel values) stored as part of a reference image frame that was previously filtered at temporal filter 400. Reference image frame 402 may be received from a buffer or memory maintaining the image data for the reference image frame. Reference image frame 402 may be a same type of image data format as current image frame 404 (e.g., YCbCr 4:4:4) or may be a different type of image data format that is converted top the same image data format (e.g., converting YCbCr 4:2:2 to YCbCr 4:4:4). Please note, as discussed above, image data at temporal filter 400, as well as other components of image signal processor 106 may be processed on a per pixel basis, such that a stream of individual pixels are received for filtering individually at temporal filter 400. Spatial support (e.g., neighboring pixels) may be also obtained for processing an individual pixel at various components in temporal filter 400, such as at motion estimation and compensation 410, filter weight generator 420, and filtered image frame generator 430.

In some embodiments, different channels of the full color encoding for reference image frame data 402 (and/or current image frame data 404) may be received via separate direct memory access (DMA) channels. For example, reference image data processed at temporal filter 400 may be in YCbCr 4:2:2 format. One DMA channel may provide luminance (Y) channel values for pixels in the image data, while another DMA channel may provide chrominance (CbCr) channel values for pixels in the image data. In this way, values for a channel in the full color encoding may be independently filtered at temporal filter 400.

Although not illustrated, in some embodiments, if differences in exposure or changes in lighting occur between reference image frame 402 and current image frame 404, it may be advantageous to adjust the brightness of the image data for the two frames so that the differences in exposure or changes in lighting do not adversely affect various analysis, modifications, or other components of temporal filter 400 with respect to the two frames. A respective normalization component may be implemented to adjust the gain and black level for the reference image frame 402 and/or the current image frame 404 respectively. For example, reference image frame 402 may be 10% brighter than the current image frame 404 (e.g., which can happen when the exposure is changing between the frames due to a function like auto-exposure trying to expose the image sensor optimally). If the brightness is different, motion estimation and compensation component 410 may give an erroneous result since the motion estimation algorithm may assume brightness is constant along the motion trajectory. In another example of adverse effect, if the brightness of reference image frame 402 and current image frame 404 does not match, a higher number of pixels in the current image frame 404 would be considered different enough than the reference image frame causing filter weight generator 420 to generate a filter weight that effectively "turns down" the filtering strength for the reference image frame 402. These and other adverse effects would reduce the quality of the filtering at temporal filter 400 (e.g., when there is only a global brightness difference between the two frames).

Normalization of brightness may be performed by compensating for the exposure differences that may be derived from the differences in exposure times and sensor gains, in various embodiments. For example, current image frame 404 may be scaled based on a set of gain and offset values. Similarly, reference image frame 402 may be scaled based on a separate set of gain and offset values.

In some embodiments, reference image frame 402 and current image frame 404 may be provided to motion estimation and compensation component 410. Motion estimation and compensation component 410 may estimate motion between the reference image frame 402 and the current image frame 404. In at least some embodiments, the motion estimate may be determined according values for a particular channel in the full color encoding of the reference frame image 402 and current image frame 404. For instance, if the reference image frame 402 and current image frame 404 are in a luminance chrominance color encoding, the motion estimate may be determined according to the values of the luminance channel for pixels in the two frames 402 and 404. Alternatively, the motion estimate may be determined in a similar fashion using another channel, such as the chrominance channel (CbCr) of the luminance-chrominance color encoding). Temporal filter 400 may be programmed or directed (e.g., by central control 320) to select the color channel (or all color channels) by which the motion estimate is determined. Once determined, the estimated motion may then be used to locally shift (or warp) the reference image frame 402 (or a portion of the reference image frame) such that the shifted frame is better aligned to the current image frame 404. In some embodiments, motion estimation and compensation component 410 may be configured to perform motion compensation dynamically without access to the entirety of either the current image frame 402 or the reference image frame 404 (or both). Once warped, warped reference image frame 412 may be provided to filter weight generator 420 and filtered image frame generator 430 to perform temporal filtering with respect to warped reference image frame 412.

Temporal filter 400 may blend the warped reference image frame 412 and the current image frame 404. The blending (or mixing) ratio may vary from pixel to pixel based on how similar a given pixel in the current image frame 404 is compared to a corresponding pixel in the warped reference image frame 412. In order to determine a mixing ratio in some embodiments, filter weight generator 420 may be configured to determine the difference between a given pixel in the current image frame 404 and the corresponding image pixel in the warped reference image frame 412 based on pixels in the current image frame 404 neighboring the given pixel in the current image frame 404, and the corresponding pixels of those neighboring pixels in the warped reference image frame 412. For example, if the difference between the given pixel in the current image frame 404 and a corresponding pixel value in the reference frame is small, then the corresponding pixel of the warped reference image frame 412 pixel may get the majority of the weight in the filtered version of the given pixel.

As noted above, temporal filter 400 may filter a value for a channel in the full color encoding for a pixel being processed independently. For instance, a luminance channel value may be filtered differently than a value for the same pixel in the chrominance channel (or one of the channels may not be filtered at all). Central control module 320, or some other control component, may direct which channels in the full color encoding to filter. Additionally, central control module 320 may determine the filtering strength for particular channels. The filtering strength for a particular channel may be applied to the mixing ratio determined for the pixel between warped reference image frame 412 and current image frame 404, as discussed above, in order to generate a filter weight for blending the value of the channel in the full color encoding for a given pixel from current image frame 404 with the value of a corresponding pixel in warped reference image frame 412. For example, separate lookup tables (which may be programmed by control module 320 or another component) may be maintained for each channel in the full color encoding. One or more values in the lookup table for a channel may be used to interpolate a filter weight for the channel based on the mixing ratio. Thus, different filter weight(s) 422 may be determined for different channels in a full color encoding of a pixel and provided to filtered image frame generator 430. Although not illustrated, in some embodiments filter weights may be modified based on noise history maintained for the corresponding pixel of the warped reference image frame 412.

Filter weight(s) 422 may be provided to filtered image frame generator 440, which may blend the value(s) of the channel(s) of the corresponding pixel of warped reference image frame 412 with the value(s) of the channel(s) of the given pixel of current image frame 404 according to the filter weight(s) 422 to generate a filtered version of the given pixel. For example, a filter weight may be represented as a value k, which may be used to determine the proportions of the value for a channel of the full color encoding for the corresponding pixel of warped reference image frame 412 (e.g., a luminance channel value) and the value of the same channel of the full color encoding for the given pixel of current image frame 404 to be blended. If k=0.7, then 70% of the value in the channel for the filtered version of the given pixel may be from the value in the channel of the corresponding pixel in warped reference image frame 412 and 1−k (0.3 or 30%) of the filtered version of the given pixel may be from the value of the channel of the given pixel of the current image frame 404. Note if multiple channels are filtered then, the different channel values may be blended according to the different filter weights. For example, a luminance channel filter weight may be k=0.7, as given above, while a chrominance channel filter weight may be k=0.4. However, it is possible that the filter weights for two different channels may be the same (as the filter weights may still be determined independently to have the same values). In those scenarios where the temporal filter is configured to filter one channel (blending values for pixels in a current image frame in the one channel without blending values for other channels), then filtered image frame generator may pass through the unfiltered channel value for the current image frame 404. Consider an example where a chrominance channel is filtered, but the luminance channel is not filtered. The chrominance channel may change for the filtered version of a pixel (e.g., from Cb from 35 to 37) while the luminance channel value (e.g., 73) may be the same in the filtered version of the given pixel.

Filtered versions of pixels may be output from temporal filter 400 as part of filtered image frame 432. In at least some embodiments, a multiplexer (MUX) may be implemented (as illustrated in FIG. 4) to select the output frame for temporal filter. For instance, the MUX may be configured to provide filtered image frame 432 or reference image frame 402 (not warped) to a downstream unit or component in the image processing pipeline as temporal filter output frame 434 (e.g., a component downstream in noise processing stage 310, color processing stage 312, output rescale unit 314, and/or output interface 316). Providing the reference frame image 402 may introduce a frame delay into the image processing pipeline, which may be utilized to programmatically configure a component downstream in the image processing pipeline. The MUX may provide either filtered image frame 432 or reference image frame based on a frame delay selection 436 (which may be programmed by central control module 320) indicating whether a delay setting is enabled or disabled. Note, that in some embodiments, the image frame delay may always be provided (or be provided by default).

In at least some embodiments, the signal processor may be configured to enable or disable spatial filtering to be performed as part of filtering performed upon a current image frame 404 before it is stored in the reference frame buffer 444. As illustrated in FIG. 4, a MUX may provide as output to reference frame buffer 444, filtered image frame 432 or spatially filtered image frame 442 based on an include spatial filter selection 446. Spatial filter 440 may be implemented as part of noise processing stage 310, and may perform spatial filtering to reduce image data noise upon the output of temporal filter 434 (not illustrated) or as part of the temporal loop (as illustrated in FIG. 4 where the reference frame stored has been spatially filtered).

Spatial filter 440 may apply a spatial filtering technique to a given pixel of filtered image frame 432. For example, in some embodiments, one or more neighboring pixels of the given pixel may be averaged with the given pixel to produce a spatially filtered version of the given pixel. Spatial filtering may be implemented in various ways. For example, some channels in the color encoding (e.g., luminance) may be spatially filtered according to certain techniques, such as by applying a simplified bilateral and NL means filter, to values of pixels in a particular channel. Spatial filter 440 may also apply different spatial filtering techniques for another channel (e.g., chrominance) in the color encoding, such as a 2D bilateral filtered, followed by a vertical IIR filter and a 1D horizontal filter. In at least some embodiments, spatial filter 440 may apply various image sharpening techniques, though those techniques may be bypassed when spatial filter 440 is included in the temporal loop (e.g., when spatially filtered image frame 442 is the output to reference frame buffer 444). Including spatial filtering in the temporal filter loop may allow for greater amounts of noise to be filtered over a series of image frames that are similar (and therefore blended together more strongly).

Please note that FIG. 4 is provided as merely an example of a temporal filter. Different combinations of the illustrated components (as well as components not illustrated) may be used to perform temporal filtering. For example, in some embodiments the MUX to implement frame delay may not be included, or spatial filter 440 may not be configurable to be implemented within the temporal loop. Similarly, in some embodiments, motion compensation and estimation component 410 may not be implemented. In some embodiments, a different type of filter weight generator (e.g., a filter weight generator that determines pixel difference based on a given pixel and corresponding pixel alone) may be implemented. Thus, the components of FIG. 4 and their respective layout or ordering is not intended to be limiting to the various other combinations which may be used to implement temporal filter 400.

Figure 5:
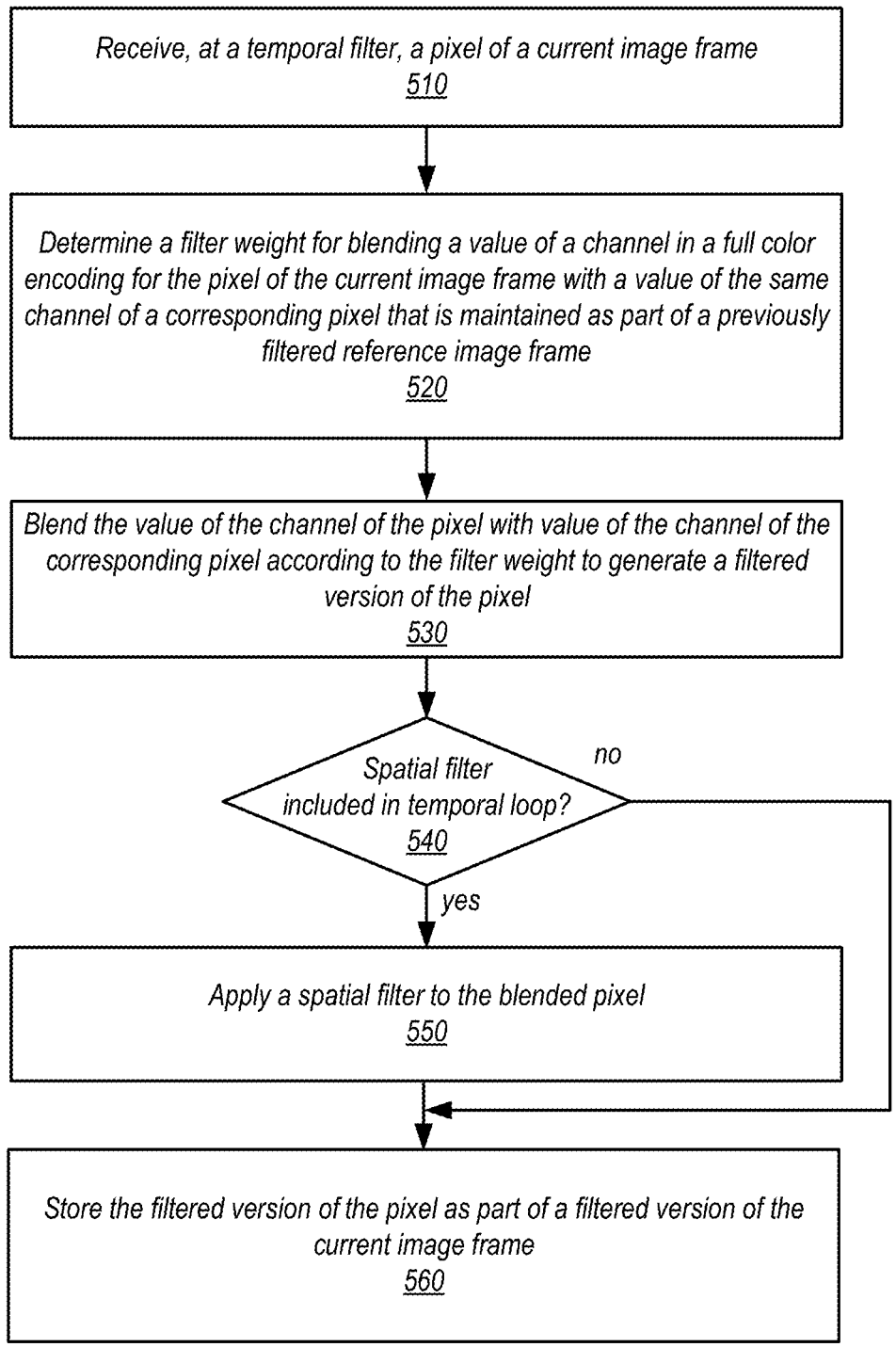
FIG. 5 is a high-level flowchart illustrating various methods and techniques for performing temporal filtering on independent color channels in image data, according to some embodiments.

FIGS. 1-4 provide an example of an image processing pipeline, image signal processor, and system which may perform temporal filtering on independent color channels in image data. However, numerous other types or configurations of systems or devices that implement an image processing pipeline and image signal processor may perform temporal filtering on independent color channels in image data. FIG. 5 is a high-level flowchart illustrating various methods and techniques for performing temporal filtering on independent color channels in image data, according to some embodiments. The various components described above may implement these techniques as well as various other image processing pipelines and image signal processors.

As indicated at 510, a pixel of a current image frame may be received at a temporal filter for processing, in various embodiments. The pixel may be received in full color encoding (e.g., RGB or YCbCr). In some embodiments, a value for a channel of the full color encoding (e.g., the luminance channel) may be received separately from another value of the channel in the full color encoding (e.g., the chrominance channel) for the same pixel (e.g., separate memory interfaces, such as DMA channels may provide the channel data for a pixel separately to the temporal filter).

As indicated at 520, a filter weight may be determined for the given pixel, in at least some embodiments. The filter weight may be determined for blending a value of a channel in a full color encoding for the pixel of the current image frame with a value of the channel in the full color encoding for a corresponding pixel of a previously filtered reference image frame. Filter weights may be determined in various ways. For example, a comparison or difference value between the given pixel and the corresponding pixel in the reference image frame may be calculated to identify a mixing ratio between the two pixels. The greater the difference value between the pixels, the lower the mixing ratio (and the lesser the amount the two pixels should be blended). Another technique, which may be performed, determines the different between the given pixel and other pixels in the current image frame neighboring the given pixel with a similar neighborhood of pixels including the corresponding pixel in the reference image frame to identify the mixing ratio. For example, though the difference between the given pixel and the corresponding pixel may be high, the differences between the other neighboring pixels may be low, which may indicate that the greater difference should not be considered as strongly when making a filter weight determination (e.g., the greater pixel difference may be caused by a defective pixel or noise). In at least some embodiments, the difference between the given pixel and the corresponding pixel (or the neighboring pixels of the given pixel and corresponding pixel) may be determined based on all channel values for the pixels of the full color encoding (even if less than all channel values are being filtered at the temporal filter).

While the mixing ratios identified according to the techniques above may be the filter weights identified for blending the given pixel and corresponding pixel, in some embodiments, a filtering strength for individual channels may be implemented to modify the mixing ratio for a particular channel. For example, in order to independently determine filtering strength per channel, different lookup tables (or other programmable data structures) may be maintained for each channel in the full color encoding (e.g., a lookup table for a luminance channel and a lookup table for a chrominance channel). The values in the lookup table may be used to interpolate a filter weight that is particular to a channel of the full color encoding based on the previously determined mixing ratio. For example, the same mixing ratio may be determined for filtering the luminance channel and chrominance channel of a current image frame. However, the particular filtering strength value(s) in the separate lookup tables for the different channels may be used to interpolate different filter weights to apply for the different channels (even though the mixing ratio is the same).

In at least some embodiments, motion compensation may be performed prior to determining filter values by determining a motion estimate between the current image frame and the reference image frame. The motion estimate may be determined by comparing values in a particular channel of the full color encoding. For example, luminance values for different pixels in the current image frame may be compared with luminance values for pixels in the reference image frame to determine the motion estimate. In at least some embodiments, the motion estimate may be determined dynamically according to a stream of pixels received for the current image without access to the complete current image frame. For example, one or more rows in the stream of pixels received for the current image frame (e.g., including the given pixel) may be evaluated with respect to the reference image frame. Once the motion estimate is determined, the reference image frame (or a portion thereof) may be warped or shifted to register the reference image frame with the current image frame.

The value of the channel for the given pixel may be blended with the value of the channel of the corresponding pixel according to the determined filter in order to generate a filtered version of the pixel, as indicated at 530, in various embodiments. As noted above, different filter weights may be generated for different channels, in which case the blending of the values may be performed according to the respective filter weight for the channel of the value being blended for the given pixel. In some embodiments, not all channels in the full color encoding may be blended for a given pixel (e.g., only luminance channel blended or only chrominance channel blended).

In at least some embodiments, a spatial filter may be included in the temporal loop (e.g., the image data stored as the next reference image frame for filtering a subsequent image frame). The image processing pipeline or image signal processor may be programmed or configured to include (or not include) the spatial filter on a frame by frame basis. As indicated by the positive exit from 540, if the spatial filter is included, then a spatial filter may be applied to the filtered version of the given pixel generated at the temporal filter, as indicated at 550. Many different spatial filtering techniques may be applied in order to filter noise from the given pixel. For instance, one or more neighboring pixels of the given pixel may be averaged with the given pixel to produce a spatially filtered version of the given pixel. Multiple combinations of techniques may be applied in some embodiments and may be applied to specific channels in the full color encoding of the given pixel (e.g., one channel may be filtered by applying a simplified bilateral and NL means filter while another channel may have applied a 2D bilateral filtered, followed by a vertical IIR filter and a 1D horizontal filter).

The filtered version of the pixel may be stored as part of a filtered version of the current image frame, as indicated at 560. The filtered version of the given pixel may also be provided to one or more subsequent image processing stages, units, or components of the image processing pipeline as the output of the temporal filter.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
   an image signal processor that comprises a temporal filter and a spatial filter, wherein the image signal processor is configured to:
   determine a filter weight for blending, at the temporal filter, a value of a channel in a full color encoding for a given pixel of a current image frame with a value of the same channel for a corresponding pixel of a previously filtered reference image frame, wherein to determine the filter weight for blending, the image signal processor is configured to:
   determine a mixing ratio for the given pixel and the corresponding pixel; and
   modify, at the temporal filter, the mixing ratio according to a given filtering strength particular to the channel in the full color encoding to determine the filter weight;
   generate, by the temporal filter, a filtered version of the given pixel as part of a filtered version of the current image frame, wherein the generation blends the value of the channel for the given pixel of the current image frame with the value of the channel for the corresponding pixel of the reference image frame according to the filter weight;
   responsive to a selection to include output of the spatial filter as part of a temporal loop that obtains the output of the spatial filter as input to the temporal filter to perform filtering of a subsequent image frame, average, by the spatial filter, the filtered version of the given pixel with one or more neighboring pixels to generate a spatially filtered version of the given pixel; and
   write the spatially filtered version of the given pixel to a system memory to be maintained as part of the filtered version of the current image frame,
   wherein the filtering strength particular to the channel in the fill color encoding is stored in a first lookup table, and a filtering strength particular to a different channel in the full color encoding is stored in a second lookup table;
   wherein the image signal processor is further configured to:
   determine a second filter weight for blending, at the temporal filter, a value of the different channel in the full color encoding for the given pixel with a value of the different channel in the full color encoding for the corresponding pixel according to the determined mixing ratio, wherein the second filter weight is determined by interpolating the filter weight that is particular to the channel of the full color encoding using the stored filtering strength particular to the different channel in the full color encoding.

2. The apparatus of claim 1, wherein to determine the filter weight for blending, the image signal processor is configured to: evaluate differences between the given pixel and the one or more neighboring pixels of the given pixel or different one or more neighboring pixels of the given pixel included in the current image frame with the corresponding pixel and one or more neighboring pixels of the corresponding pixel included in the previously filtered reference image frame to determine the mixing ratio for the given pixel and the corresponding pixel.

3. The apparatus of claim 1, wherein the image signal processor is further configured to:
 responsive to a selection to exclude the spatial filter from the temporal loop, bypass the spatial filter when processing a different image frame such that a filtered version of the different image frame generated by the temporal filter is written to the system memory to be another reference image frame without being spatially filtered.

4. The apparatus of claim 1, wherein the image signal processor is further configured to:
 prior to the determination of the filter weight:
  determine a motion estimate that registers the channel in the full color encoding of the previously filtered reference image frame with respect to the channel of the current image frame; and
  warp at least a portion of the previously filtered reference image frame according to the determined motion estimate, wherein the corresponding pixel of the previously filtered reference image frame is identified for blending subsequent to the warp of the previously filtered reference image frame.

5. The apparatus of claim 1, wherein the full color encoding is a luminance-chrominance color encoding and wherein the channel in the luminance-chrominance color encoding is a luminance channel.

6. The apparatus of claim 1,
 wherein the determination, the generation, and the write are performed for each pixel of the current image frame; and
 for a given pixel of a new image frame received at the temporal filter, the image signal processor is further configured to perform the determination, the generation and the write with respect to the filtered version of the current image frame as a new reference image frame.

7. The apparatus of claim 1, wherein the apparatus comprises a mobile computing device.

8. A method, comprising:
 determining, by an image signal processor, a respective filter weight for blending, at a temporal filter module, a value of a channel in a full color encoding for a given pixel of a current image frame with a value of the same channel of a corresponding pixel maintained as part of a previously filtered reference image frame, wherein determining the filter weight for blending comprises:
  determining a mixing ratio for the given pixel and the corresponding pixel; and
  modifying, at the temporal filter module, the mixing ratio according to a given filtering strength particular to the channel in the full color encoding to determine the filter weight;
 generating, by the image signal processor, a filtered version of the given pixel as part of a filtered version of the current image frame, wherein the generating comprises blending the value of the channel for the given pixel of the current image frame with the value of the channel for the corresponding pixel of the reference image frame according to the respective filter weight;
 responsive to a selection to include output of the spatial filter as part of a temporal loop that obtains the output of the spatial filter as input to the temporal filter to perform filtering of a subsequent image frame, averaging, by the image signal processor at a spatial filter, the filtered version of the given pixel with one or more neighboring pixels to generate a spatially filtered version of the given pixel;
 storing the filtering strength particular to the channel in the full color encoding in a first lookup table, and storing a filtering strength particular to a different channel in the full color encoding in a second lookup table; and
 determining a second filter weight for blending, at the temporal filter module, a value of the different channel in the full color encoding for the given pixel with a value of the different channel in the full color encoding for the corresponding pixel according to the determined mixing ratio, wherein the second filter weight is determined by interpolating the filter weight that is particular to the channel of the full color encoding using the stored filtering strength particular to the different channel in the full color encoding.

9. The method of claim 8, further comprising:
 prior to determining the respective filter weight:
  determining, by the image signal processor, a motion estimate that registers the channel in the full color encoding of the previously filtered reference image frame with respect to the channel of the current image frame; and
  warping, by the image signal processor, at least a portion of the previously filtered reference image frame according to the determined motion estimate, wherein the corresponding pixel of the previously filtered reference image frame is identified for blending subsequent to the warping of the previously filtered reference image frame.

10. The method of claim 8, wherein the method further comprises evaluating differences between the given pixel and the one or more neighboring pixels of the given pixel or different one or more neighboring pixels of the given pixel included in the current image frame with the corresponding pixel and one or more neighboring pixels of the corresponding pixel included in the previously filtered reference image frame to determine the mixing ratio for the given pixel and the corresponding pixel.

11. The method of claim 8, further comprising:
 responsive to a selection to exclude the spatial filter from the temporal loop, bypassing, by the image signal processor, the spatial filter when processing a different image frame such that a filtered version of the different image frame generated by the temporal filter is written to the system memory to be another reference image frame without being spatially filtered.

12. The method of claim 8, wherein the full color encoding is a luminance-chrominance color encoding and wherein the channel in the luminance-chrominance color encoding is a chrominance channel.

13. The method of claim 8, further comprising:
 wherein the determining, the generating, and the averaging are performed for each pixel including the pixel that comprises the current image frame;

storing the spatially filtered version generated for each pixel that comprises the current image frame as part of the filtered version of the current image frame; and for a given pixel of a new image frame, performing the determining, the generating, and the averaging with respect to the filtered version of the current image frame stored as a new reference image frame.

14. A system, comprising:

a device comprising circuitry configured to perform image processing, the device comprising:
- a sensor interface configured to receive image data from an image sensor; and
- an image processing pipeline comprising a temporal filter and a spatial filter, wherein the image processing pipeline is configured to:
  - evaluate, by the temporal filter, differences between a given pixel and one or more neighboring pixels of the given pixel included in a current image frame with a corresponding pixel and one or more neighboring pixels of the corresponding pixel included in a previously filtered reference image frame to determine a mixing ratio for the given pixel and the corresponding pixel;
  - modify, by the temporal filter, the mixing ratio according to a given filtering strength particular to a channel in a full color encoding to determine a filter weight for blending a value of the channel for the given pixel with a value of the channel for the corresponding pixel;
  - generate, by the temporal filter, a filtered version of the given pixel, wherein to generate the filtered version, the image processing pipeline is configured to:
    - blend, by the temporal filter, the value of the channel for the given pixel of the current image frame with the value of the channel for the corresponding pixel of the reference image frame according to the filter weight; and
  - responsive to a selection to include output of the spatial filter as part of a temporal loop that obtains the output of the spatial filter as input to the temporal filter to perform filtering of a subsequent image frame, average, by the spatial filter, the filtered version of the given pixel with one or more neighboring pixels to generate a spatially filtered version of the given pixel;
  - write the spatially filtered version of the given pixel to a system memory to be maintained as part of a new reference image frame for filtering a subsequent image frame,
  - store the filtering strength particular to the channel in the full color encoding in a first lookup table, and store a filtering strength particular to a different channel in the full color encoding in a second lookup table; and
  - determining a second filter weight for blending, by the temporal filter, a value of the different channel in the full color encoding for the given pixel with a value of the different channel in the full color encoding for the corresponding pixel according to the determined mixing ratio, wherein the second filter weight is determined by interpolating the filter weight that is particular to the channel of the full color encoding using the stored filtering strength particular to the different channel in the full color encoding.

15. The system of claim 14, wherein the image processing pipeline is further configured to:

responsive to a selection to exclude the spatial filter from the temporal loop, bypass the spatial filter when processing a different image frame such that a filtered version of the different image frame generated by the temporal filter is written to the system memory to be another reference image frame without being spatially filtered.

16. The system of claim 14, wherein a respective value of the given pixel for one or more remaining channels in the full color encoding different than the channel is not blended with a respective value of the corresponding pixel for the one or more remaining channels when the filtered version of the given pixel is generated.

17. The system of claim 14, wherein the system is a mobile computing device, and wherein the device is an image signal processor.

\* \* \* \* \*